US 012523502B2

(12) United States Patent
Mukai et al.

(10) Patent No.: US 12,523,502 B2
(45) Date of Patent: Jan. 13, 2026

(54) FAULT DETECTION DEVICE FOR ENCODER WIRING

(71) Applicant: NIDEC INSTRUMENTS CORPORATION, Nagano (JP)

(72) Inventors: Kokyu Mukai, Nagano (JP); Hajime Takagi, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 254 days.

(21) Appl. No.: 18/329,567

(22) Filed: Jun. 5, 2023

(65) Prior Publication Data

US 2023/0408302 A1 Dec. 21, 2023

(30) Foreign Application Priority Data

Jun. 16, 2022 (JP) .................. 2022-097552

(51) Int. Cl.
*G01D 5/244* (2006.01)
*G01R 31/52* (2020.01)
*G01R 31/54* (2020.01)
*G01R 31/58* (2020.01)

(52) U.S. Cl.
CPC ......... *G01D 5/24457* (2013.01); *G01R 31/52* (2020.01); *G01R 31/54* (2020.01); *G01R 31/58* (2020.01)

(58) Field of Classification Search
CPC .. G01D 5/24457; G01D 5/24461; G01D 3/08; G01D 2218/10; B25J 13/088; B25J 9/1674; B25J 13/00; B25J 19/0095; B25J 19/02; B25J 19/1633; H02P 6/16; G01R 31/52; G01R 31/54; G01R 31/56; G01R 31/58; G05B 2219/39001

See application file for complete search history.

(56) References Cited

U.S. PATENT DOCUMENTS 6,236,325 B1 * 5/2001 Kuroki ..................... G01D 7/00
                                              700/13
8,823,576 B2   9/2014 Taniguchi et al.
10,360,784 B2 * 7/2019 Matsukane ........ G01D 5/24461
(Continued)

FOREIGN PATENT DOCUMENTS

JP         S6291267       4/1987
JP         H04355322      12/1992
(Continued)

*Primary Examiner* — Steven L Yeninas
(74) *Attorney, Agent, or Firm* — JCIPRNET

(57) ABSTRACT

A fault detection device is provided which detects a fault having occurred in encoder wiring in a system including a controlled apparatus having an encoder and a controller controlling the controlled apparatus and, in the system, the encoder and the controller are connected with each other through the encoder wiring. In a case that a signal which is transmitted from the encoder to the controller is defined as a first signal, and a signal which is transmitted from the controller to the encoder is defined as a second signal, the fault detection device includes a first detection circuit which detects a fault in the encoder wiring through which the first signal is transmitted, and a second detection circuit which detects a fault in the encoder wiring through which the second signal is transmitted.

7 Claims, 4 Drawing Sheets

(56) References Cited

U.S. PATENT DOCUMENTS

| | | | | |
|---|---|---|---|---|
| 2008/0079624 A1* | 4/2008 | Taniguchi | ............ | G01D 5/24457 341/173 |
| 2008/0172202 A1* | 7/2008 | Nakazato | ................. | G01D 3/08 324/555 |
| 2010/0194401 A1* | 8/2010 | Uemura | ............. | G01D 5/24461 324/537 |
| 2010/0201373 A1* | 8/2010 | Sato | ................... | G01D 5/24461 324/537 |
| 2012/0185213 A1* | 7/2012 | Wada | ....................... | G01D 5/20 702/183 |
| 2013/0207665 A1* | 8/2013 | Bandyopadhyay | .... | G01R 31/50 324/537 |
| 2015/0077156 A1* | 3/2015 | Kim | .................... | G01D 5/2448 324/765.01 |
| 2016/0061631 A1* | 3/2016 | Kondo | ................... | G01D 3/028 324/207.15 |
| 2018/0209820 A1* | 7/2018 | Hammerschmidt | .... | G01P 21/02 |
| 2020/0072863 A1* | 3/2020 | Sasaki | ........................ | G01P 3/52 |
| 2022/0161427 A1* | 5/2022 | Yerazunis | .............. | B25J 9/1674 |

FOREIGN PATENT DOCUMENTS

| | | |
|---|---|---|
| JP | 4058431 | 3/2008 |
| JP | 2008092620 | 4/2008 |

* cited by examiner

FAULT DETECTION DEVICE FOR ENCODER WIRING

CROSS REFERENCE TO RELATED APPLICATION

The present invention claims priority under 35 U.S.C. § 119 to Japanese Application No. 2022-097552 filed Jun. 16, 2022, the entire content of which is incorporated herein by reference.

TECHNICAL FIELD

At least an embodiment of the present invention may relate to a fault detection device for detecting a fault in encoder wiring in a system including a controlled apparatus provided with an encoder and a controller for controlling the controlled apparatus based on a signal from the encoder.

BACKGROUND

A system has been known which includes a controlled apparatus having an encoder and a controller for controlling the controlled apparatus based on a signal from the encoder. For example, in a robot system structured of a manipulator whose axes have respective motors and a controller for servo-controlling the motors provided in the manipulator, an encoder for detecting a rotation position of the motor is attached to the motor of each axis, and a motor position detected by the encoder is fed back to the controller for servo-controlling. Recently, digitized encoders have spread and, in a digital encoder, a command is transmitted to an encoder from the controller. Therefore, encoder wiring is provided between the controller and an encoder in the manipulator for transmission of a signal. As a mode of encoder wiring, for example, a configuration has been known in which encoder pulses are simply transmitted, binary logic values of "0" and "1" are transmitted, or a differential signal wiring configured to transmit a pair of differential output signals comprised of a logic signal and an inverted signal thereof.

When a fault such as a disconnection or a short-circuit occurs in encoder wiring, the system does not operate normally. Therefore, various methods for detecting a fault in encoder wiring have been proposed. In Japanese Patent Laid-Open No. Shou 62-91267 (Patent Literature 1) and Japanese Patent Laid-Open No. Hei 4-355322 (Patent Literature 2), a disconnection detection circuit is disclosed in which encoder wiring is configured of a differential signal wiring, and signals from a pair of signal lines configuring a differential signal wiring are inputted to an exclusive OR (Ex-OR) gate and, when an output of the exclusive OR gate becomes "0", it is determined that the encoder wiring has a disconnection. Japanese Patent No. 4058431 (Patent Literature 3) discloses that an encoder power supply, a disconnection detection power supply having a voltage higher than that of the encoder power supply, and an overvoltage prevention diode on the encoder side are used for detecting a disconnection of encoder wiring from an open collector output type encoder.

In order to easily identify an abnormality location when an abnormality has occurred in communication with an encoder, Japanese Patent Laid-Open No. 2008-92620 (Patent Literature 4) discloses an encoder communication circuit which includes a communication part having the same interface as the interface of the encoder and an encoder data creation part in which predetermined encoder data are created. When an abnormality has occurred in communication with the encoder, the encoder communication circuit is connected instead of the encoder and thereby, it can be identified whether a cause of the abnormality exists in wiring, or in the encoder itself, or in a communication circuit on the controller side.

When a fault has occurred in encoder wiring, in order to identify a fault location, it is required that every encoder wiring is confirmed by visual observation, or wiring is replaced for confirming the fault location and thus, much time is required to identify the fault location. For example, in a system including a conveyance robot, a wiring length from a controller to a manipulator sometimes exceeds 10 m and, also in an inside of the manipulator, a wiring length to each individual encoder may exceed 10 m and thus, the entire extended length of the encoder wiring may reach several ten meters. In a robot system, when a fault has occurred in encoder wiring, downtime for identifying the fault location becomes remarkably long. Even when disconnection of encoder wiring is capable of being detected by using the detection circuits shown in Patent Literatures 1 through 3, work is required such that the entire encoder wiring is inspected by visual observation for identifying the disconnection location. Further, even when the encoder communication circuit shown in Patent Literature 4 is used, the fault location of encoder wiring cannot be detected. In addition, even when a controlled apparatus which is controlled by a controller is an apparatus other than a manipulator, in a case that the controlled apparatus includes an encoder and is controlled according to an output of the encoder by a controller, similar problems exist.

SUMMARY

At least an embodiment of the present invention may advantageously provide a fault detection device which is capable of detecting occurrence of a fault when the fault has occurred in encoder wiring and easily identifying a location where the fault has occurred.

According to at least an embodiment of the present invention, there may be provided a fault detection device which detects a fault having occurred in encoder wiring in a system including a controlled apparatus having an encoder and a controller controlling the controlled apparatus and, in the system, the encoder and the controller are connected with each other through the encoder wiring. In a case that a signal which is transmitted from the encoder to the controller is defined as a first signal, and a signal which is transmitted from the controller to the encoder is defined as a second signal, the fault detection device includes a first detection circuit which detects a fault in the encoder wiring through which the first signal is transmitted, and a second detection circuit which detects a fault in the encoder wiring through which the second signal is transmitted.

A conventional detection circuit for detecting occurrence of a fault in the encoder wiring is provided only at a position in a controller where a signal from the encoder is received. However, according to this configuration, it is not sufficient to detect a fault occurred in the encoder wiring, and it is difficult to identify a location of the fault having occurred. In the fault detection device in accordance with an embodiment of the present invention, a detection circuit is provided in both of encoder wiring through which a signal (i.e., a first signal) is transmitted from the encoder to the controller and encoder wiring through which a signal (i.e., a second signal) is transmitted from the controller to the encoder and thereby, occurrence of a fault in the encoder wiring can be further surely detected and a location of the fault having occurred can be easily identified. In addition, in this case, when the second detection circuit is provided in the controlled apparatus, in a section from the controller to the controlled apparatus, occurrence of a fault in the encoder wiring for the second signal can be further surely detected.

In accordance with an embodiment of the present invention, an interface part is provided in the controlled apparatus, for example, by using a circuit board, and the encoder wiring is divided into interface wiring between the controller and the interface part and in-apparatus wiring between the interface part and the encoder. The interface part includes a first receiver which receives the first signal through the in-apparatus wiring, a first driver which transmits the first signal through the interface wiring based on a received result in the first receiver, a second receiver which receives the second signal through the interface wiring, and a second driver which transmits the second signal through the in-apparatus wiring based on a received result in the second receiver. A first detection circuit is provided on an input side of the first receiver in the interface part, and a second detection circuit is provided on an input side of the second receiver in the interface part. In a case that a receiver is provided for receiving a signal from the encoder wiring and a signal is transmitted from the driver to another encoder wiring based on a received result in the receiver, even when a fault has occurred in the encoder wiring which is connected with the receiver, the receiver outputs a logic signal of "0" or "1", and the driver transmits a signal to the encoder wiring based on the logic signal. In other words, a normal signal is observed in the encoder wiring on a side where a signal is transmitted from the driver. This means that, when a combination of a receiver and a driver is inserted into the encoder wiring so that an output of the receiver is connected with an input of the driver, a fault in the encoder wiring can be identified in the inserted position. Therefore, a receiver and a driver are arranged in the interface part and thereby, a fault location in the encoder wiring can be easily identified.

In a case that the first detection circuit and the second detection circuit are provided in the interface part of the controlled apparatus, a processor such as a microprocessor which is connected with the controller is provided, and detection results of the first detection circuit and the second detection circuit are inputted to the processor. According to this configuration, the controller is capable of recognizing detection results in the first detection circuit and the second detection circuit and thus, a location of a fault having occurred in the encoder wiring can be easily identified in the controller. Further, in a case that the controlled apparatus is provided with a plurality of the encoders, the encoder wiring, the first detection circuit and the second detection circuit are provided for each of the encoders. In this case, the processor is commonly provided for a plurality of the encoders. According to this configuration, even when a plurality of the encoders is provided, only one processor is provided in the interface part and thus, a configuration of the interface part can be simplified and the number of wirings between the interface part and the controller can be reduced.

In a case that the first detection circuit is provided in the interface part, it may be configured that a third detection circuit which detects a fault in the interface wiring through which the first signal is transmitted is provided in an inside of the controller. When the third detection circuit is provided, a fault location in the encoder wiring can be further easily identified.

In a fault detection device in accordance with another embodiment of the present invention, the first detection circuit and the second detection circuit are provided in an inside of the controller. Even in a case that the first detection circuit and the second detection circuit are unable to be provided in the controlled apparatus, when the first detection circuit and the second detection circuit are provided in an inside of the controller, a fault location in the encoder wiring is easily identified.

Transmission modes of the first signal and the second signal are arbitrary, but the first signal and the second signal are, for example, transmitted in a mode of differential output signals. In this case, when the first detection circuit and the second detection circuit are configured by using an exclusive OR gate, faults in various fault modes can be detected with a simple circuit configuration.

The controlled apparatus to which the fault detection device in accordance with an embodiment of the present invention is applied is, for example, a manipulator in a robot system. A large number of encoders is provided in a manipulator and the encoder wiring is apt to become long. However, when the fault detection device in accordance with an embodiment of the present invention is applied, in a case that a fault has occurred in encoder wiring, time required to identify a fault location can be extremely reduced.

Effects of the Invention

According to at least an embodiment of the present invention, when a fault has occurred in encoder wiring, occurrence of the fault is capable of being detected and a location where the fault has occurred is easily identified.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings. A fault detection device in accordance with an embodiment of the present invention is a device used in a system which includes a controlled apparatus having an encoder and a controller controlling the controlled apparatus and in which the encoder and the controller are connected with each other through encoder wiring, and the fault detection device is configured to detect a fault occurred in the encoder wiring. In the following descriptions, a system is a robot system structured of a controller and a manipulator, and a controlled apparatus is the manipulator. In this case, the controller is configured to servo-control motors based on outputs from encoders provided in the motors of respective axes of the manipulator. The system to which the present invention is applied is not limited to a robot controller, and the controlled apparatus is not limited to a manipulator.

Figure 1:
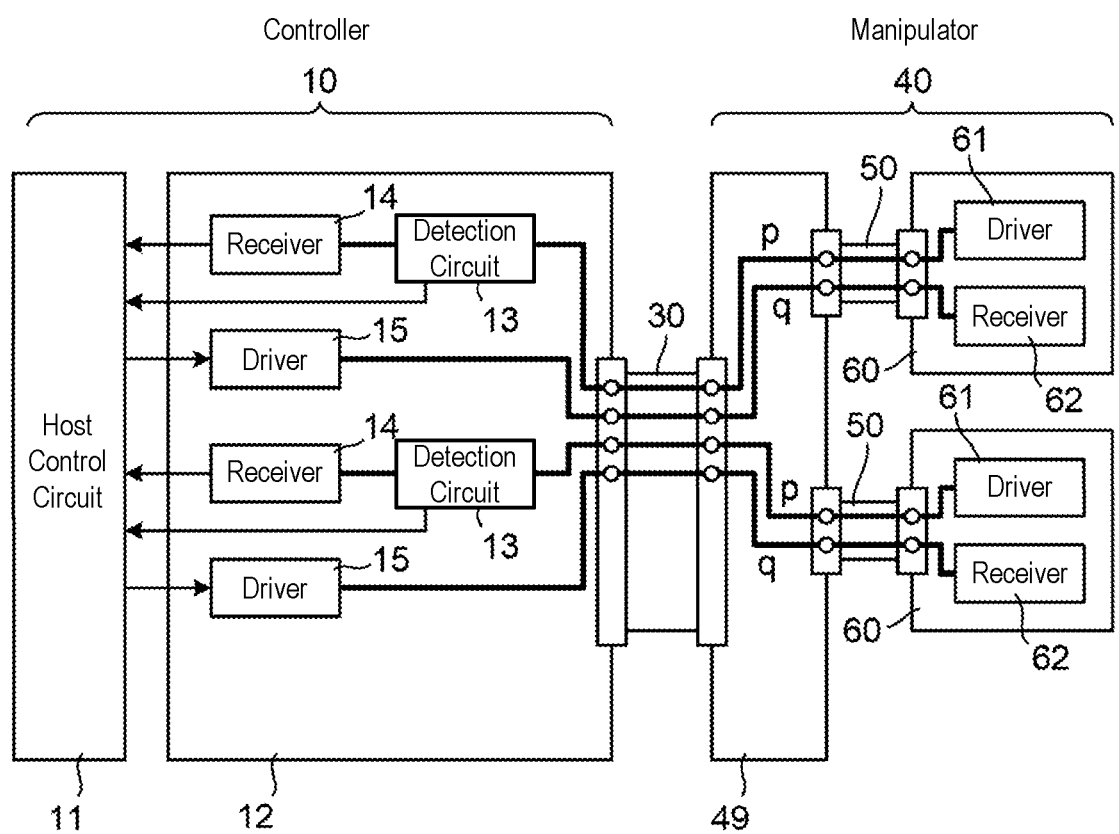
FIG. 1 is a view showing encoder wiring in a general robot system.

First, encoder wiring in a general robot system will be described below with reference to FIG. 1. A robot system shown in FIG. 1 is structured of a controller 10 and a manipulator 40. The manipulator 40 includes a plurality of axes and a plurality of encoders 60. In FIG. 1, two encoders 60 are shown. In FIG. 1, the thick line indicates encoder wiring. For each encoder 60, an encoder wiring "p" is provided for sending a signal from an encoder 60 to the controller 10, and an encoder wiring "q" is provided for sending a signal from the controller 10 to the encoder 60. The controller 10 and the manipulator 40 are connected with each other through an interface cable 30 which bundles the encoder wirings "p" and "q" corresponded to each of a plurality of the encoders 60. Further, the manipulator 40 includes a distribution part 49 which is a connecting portion of the interface cable 30 and, in the distribution part 49, the encoder wirings "p" and "q" bundled into the interface cable 30 are divided into encoder wirings "p" and "q" of each individual encoder 60. The encoder wiring "p" and "q" between the distribution part 49 and the individual encoder 60 are accommodated in an in-apparatus cable 50 provided for each encoder 60.

The controller 10 includes a host control circuit 11 which performs an operation for servo-controlling a motor based on a motor position notified by a signal from an encoder 60 and creates a command for the encoder 60 to transmit as a signal, and a connection part 12 which is connected with the host control circuit 11 and the encoder wirings "p" and "q". The connection part 12 includes a detection circuit 13 which is provided so as to correspond to each of the encoders 60 for detecting a fault such as disconnection in the encoder wiring "p" through which a signal is transmitted from the encoder 60, a receiver 14 which receives the signal transmitted through the encoder wiring "p" to output it to the host control circuit 11, and a driver 15 which is connected with the host control circuit 11 to receive a signal and transmit the signal to the encoder 60 through the encoder wiring "q". The detection circuit 13 uses a disconnection detection circuit which is, for example, shown in Patent Literatures 1 through 3, and a detected result in the detection circuit 13 is inputted into the host control circuit 11. Further, the encoder 60 includes a driver 61 which transmits a signal to the encoder wiring "p", and a receiver 62 which receives a signal through the encoder wiring "q".

In the robot system shown in FIG. 1, when a fault such as disconnection has occurred in the encoder wiring "p" through which a signal is transmitted from the encoder 60 to the controller 10, occurrence of the fault can be detected by the detection circuit 13. However, in this case, it is unable to identify whether an occurrence location of the fault is the interface cable 30 or the in-apparatus cable 50. Further, a fault is unable to be directly detected in the encoder wiring "q" through which a signal is transmitted from the controller 10 to the encoder 60. When a fault has occurred in the encoder wiring "q", a command does not reach the encoder 60. Therefore, although a command has been transmitted, when it is detected that the encoder 60 does not send a signal corresponding to the command, occurrence of the fault in the encoder wiring "q" can be indirectly estimated. However, in this case, the fault is unable to be recognized that it is a fault in the encoder wiring "q" or a failure of the encoder 60 itself and, in addition, it is unable to identify that an occurrence location of the fault in the encoder wiring "q" is the interface cable 30 or the in-apparatus cable 50.

Figure 2:
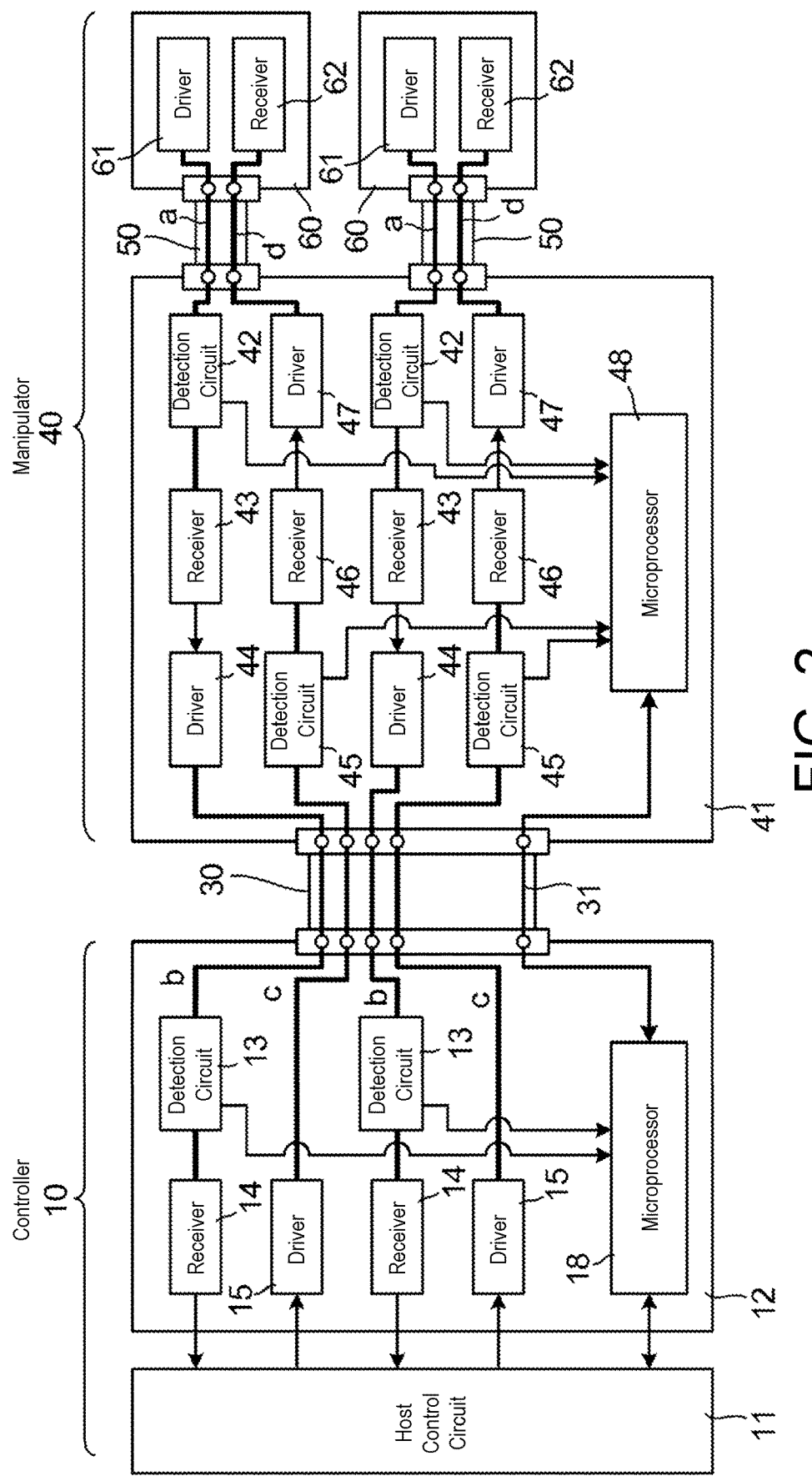
FIG. 2 is a block diagram showing a robot system in accordance with an embodiment of the present invention.

A fault detection device in accordance with an embodiment of the present invention is to solve a problem in a general robot system as shown in FIG. 1 that it is insufficient to detect occurrence of a fault in the encoder wiring and to identify its fault location. FIG. 2 is a block diagram showing a robot system in accordance with an embodiment of the present invention. The robot system is structured so as to include a fault detection device in accordance with an embodiment of the present invention.

A robot system shown in FIG. 2 is configured so that, in the manipulator 40 of the robot system shown in FIG. 1, an interface part 41 is provided instead of the distribution part 49, and a microprocessor 18 is provided in the connection part 12 of the controller 10. A detection result from the detection circuit 13 provided in the controller 10 is not directly inputted into the host control circuit 11 but is inputted into the microprocessor 18. Further, the encoder wiring "p" through which a signal is transmitted from the encoder 60 to the controller 10 is divided into an in-apparatus wiring "a", which is encoder wiring from the encoder 60 to the interface part 41, and an interface wiring "b" which is wiring from the interface part 41 to the controller 10. Similarly, the encoder wiring "q" through which a signal is transmitted from the controller 10 to the encoder 60 is divided into an interface wiring "c" from the controller 10 to the interface part 41 and an in-apparatus wiring "d" from the interface part 41 to the encoder 60. In the interface cable 30, the interface wirings "b" and "c" corresponding to a plurality of encoders 60 are bundled up. In the in-apparatus cable 50 provided in the manipulator 40 for each of the encoders 60, the in-apparatus wirings "a" and "d" corresponding the encoders are bundled up.

The interface part 41 includes, for each in-apparatus wiring "a" through which a signal is transmitted from each encoder 60, a detection circuit 42 which detects a fault such as disconnection or a short circuit of the in-apparatus wiring "a", a receiver 43 which receives a signal transmitted from the in-apparatus wiring "a", and a driver 44 which transmits a signal based on a received result of the receiver 43 toward the controller 10 through the interface wiring "b". Further, the interface part 41 includes, for each interface wiring "c" through which a signal is transmitted from the controller 10 for each encoder 60, a detection circuit 45 which detects a fault in the interface wiring "c", a receiver 46 which receives a signal transmitted from the interface wiring "c", and a driver 47 which transmits a signal based on a received result of the receiver 46 toward the corresponding encoder 60 through the in-apparatus wiring "d". According to this configuration, in the interface part 41, the detection circuit 42 is provided on an input side of the receiver 43, and the detection circuit 45 is provided on an input side of the receiver 46. The detection circuits 42 and 45 may be similarly configured to the detection circuit 13 which is provided in the controller 10.

The interface part 41 further includes a microprocessor 48. Even in a case that a plurality of encoders 60 is provided in the manipulator 40, and the detection circuits 42 and 45, the receivers 43 and 46 and the drivers 44 and 47 are respectively provided in the interface part 41 so as to correspond to the number of the encoders 60, the number of the microprocessor 48 provided in the interface part 41 is one in principle, and the microprocessor 48 is common for a plurality of the encoders 60. The microprocessor 48 is connected with the microprocessor 18 provided in the controller 10 through a serial communication line 31 which is set in the interface cable 30. Detection results from the detection circuits 42 and 45 which are provided in the interface part 41 are inputted into the microprocessor 48. The microprocessor 48 transmits the received detection result to the host control circuit 11 through the microprocessor 18 in the controller 10. As the microprocessor 48, an existing microprocessor may be utilized which is used for transmitting measurement results of a temperature sensor (not shown) and an acceleration sensor (not shown) provided in the manipulator 40 to the controller 10.

Next, a case in which a fault has occurred in the encoder wiring in the robot system shown in FIG. 2 will be described below. In the encoder wiring through which a signal is transmitted from the encoder 60 to the controller 10, when a fault has occurred in the in-apparatus wiring "a", the fault is detected by the detection circuit 42 in the interface part 41, and occurrence of the fault is transmitted to the controller 10 through the microprocessor 48. Even when a fault has occurred in the in-apparatus wiring "a", the receiver 43 which receives a signal from the in-apparatus wiring "a" outputs, for example, a binary logic signal of "0" or "1" to the driver 44, and the driver 44 outputs a signal to the interface wiring "b" based on the signal from the receiver 43. In this case, the signal which is outputted to the interface wiring "b" has the same characteristic as the signal at a normal state and is regarded as a normal signal. Further, when the interface wiring "b" is normal at that time, the detection circuit 13 in the controller 10 does not detect the fault. In other words, in the robot system shown in FIG. 1, a fault is detected so that the fault has occurred somewhere in the encoder wiring "p" by the detection circuit 13. On the other hand, in the system shown in FIG. 2, the fault is detected as a fault in the in-apparatus wiring "a" which is the encoder wiring in the manipulator 40 and thus, the fault location is identified. Similarly, when a fault has occurred in the interface wiring "b", the fault is detected by the detection circuit 13 in the controller 10. However, in this case, the detection circuits 42 and 45 provided in the interface part 41 do not detect the fault and thus, also in this case, the fault location is identified. A fault in the interface wiring "c" is detected by the detection circuit 45 provided in the interface part 41.

In the robot system shown in FIG. 2, detection results of the detection circuits 42 and 45 are transmitted to the host control circuit 11 through the microprocessor 48 and the microprocessor 18, and a detection result of the detection circuit 13 is transmitted to the host control circuit 11 through the microprocessor 18. The host control circuit 11 recognizes occurrence of the fault in the encoder wiring based on the detection results and identifies a location of the fault having occurred. When the location of the fault having occurred is identified, the host control circuit 11 is, for example, capable of indicating the location of the encoder wiring on a display device (not shown).

Figure 3:
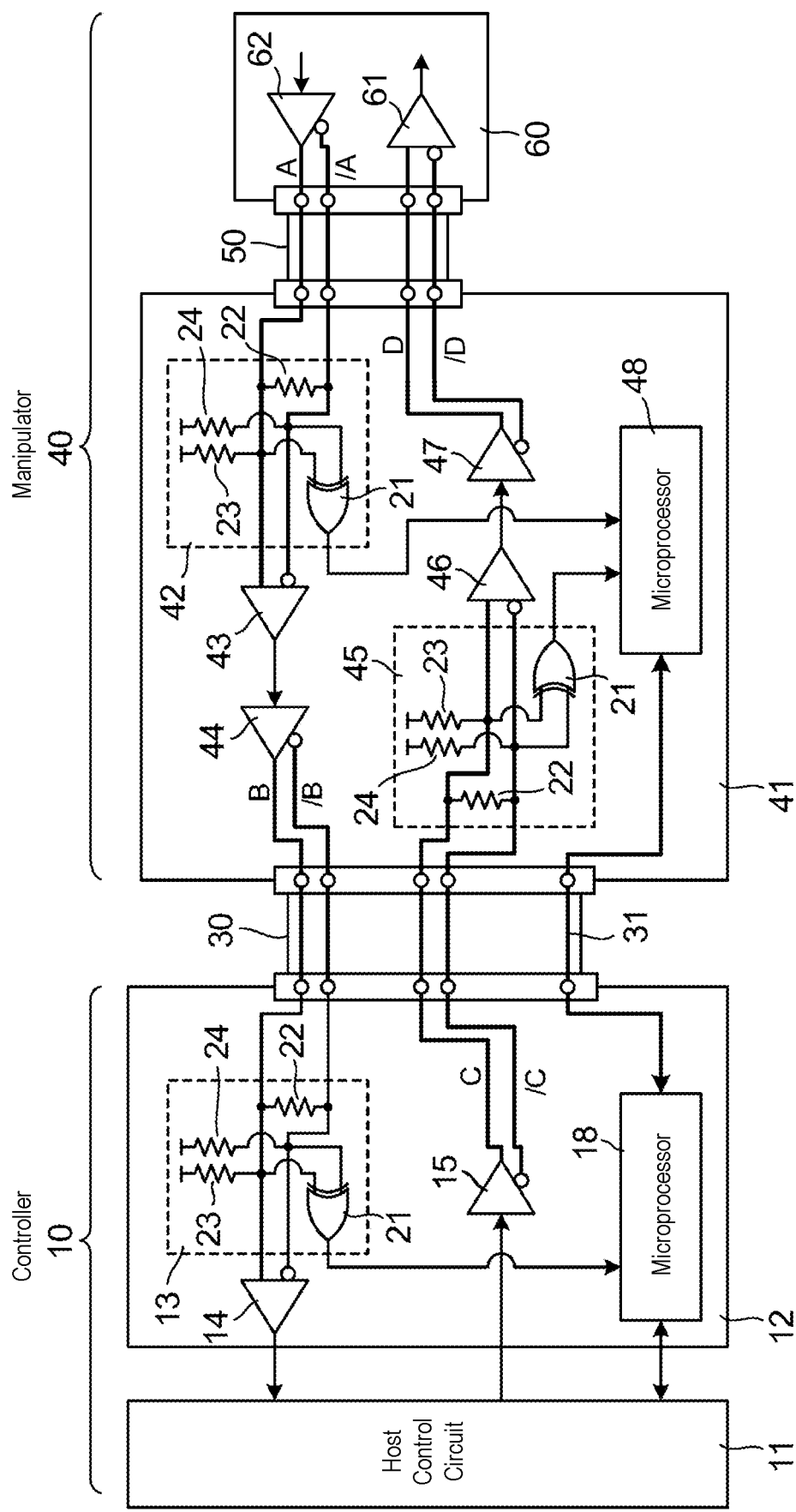
FIG. 3 is a view showing a configuration of a robot system in FIG. 2 in a case that communication with an encoder is performed by using differential output signals.

FIG. 3 is a view showing a detail configuration in which differential output signals are used in transmission of a signal in the encoder wiring in the robot system shown in FIG. 2. In FIG. 3, in order to easily observe the drawing, only one encoder 60 which is connected with the manipulator 40 is shown. Since differential output signals are transmitted, each of the drivers 15, 44, 47 and 62 is configured as a line driver which simultaneously outputs a non-inverted logic signal and an inverted logic signal, and each of the receivers 14, 43, 46 and 61 is configured as a line receiver which simultaneously receives a non-inverted logic signal and an inverted logic signal. The in-apparatus wiring "a" is configured of a pair of signal lines comprised of a signal line "A" of a non-inverted logic signal and a signal line "/A" of an inverted logic signal. Similarly, the interface wiring "b" is comprised of signal lines "B" and "/B", the interface wiring "c" is comprised of signal lines "C" and "/C", and the in-apparatus wiring "d" is comprised of signal lines "D" and "/D".

The detection circuits 13, 42 and 45 are configured the same as each other. For example, the detection circuit 42 is configured of an exclusive OR (Ex-OR) gate 21 whose one side input terminal is connected with the signal line "A" and the other side input terminal is connected with the signal line "/A", a resistor 22 which is inserted between the signal line "A" and the signal line "/A", and resistors 23 and 24 which respectively pull up the signal line "A" and the signal line "/A" to a power supply voltage. In the detection circuit 42 which uses the Ex-OR gate 21, when the in-apparatus wiring "a" is normal, the signal line "A" and the signal line "/A" are mutually inverted and thus, an output of the Ex-OR gate 21 is "1". On the other hand, when one of the signal line "A" and the signal line "/A" is disconnected within the in-apparatus cable 50, two input terminals of the Ex-OR gate 21 become the same level as each other through the resistor 22 and thus, the output of the Ex-OR gate 21 becomes "0" and occurrence of a fault is detected. When both of the signal line "A" and the signal line "/A" are disconnected, the two input terminals become the same level by the pull-up resistors 23 and 24 and thus, occurrence of a fault is detected. In a case that an output of the signal line "A" is "1", when the signal line "A" has short-circuited with the ground, the two input terminals of the Ex-OR gate 21 become "0" and thus, occurrence of the fault is similarly detected. Similarly, in a case that an output of the signal line "A" is "1", when the signal line "/A" has short-circuited with a power supply, two input terminals of the Ex-OR gate 21 become "1" and thus, occurrence of the fault is similarly detected. When the signal line "A" and the signal line "/A" are short-circuited with each other, the two input terminals of the Ex-OR gate 21 become the same level as each other and thus, occurrence of the fault is detected. Also in the detection circuits 13 and 45, occurrence of a fault is similarly detected. As described above, according to the detection circuits 13, 42 and 45, faults in various fault modes in the encoder wiring are detected with a simple circuit configuration.

In the embodiment described above, the interface part 41 is provided in the manipulator 40, and the encoder wiring is divided into the interface wirings "b" and "c" on the controller 10 side and the in-apparatus wirings "a" and "d" on the encoder 60 side and, in the interface part 41, the interface wirings "b" and "c" and the in-apparatus wirings "a" and "d" are connected through a combination of the receivers 43 and 46 and the drivers 44 and 47 and, in addition, the detection circuits 42 and 45 are provided on the input sides of the receivers 43 and 46. According to this configuration, occurrence of a fault is detected and, in addition, a location of the fault having occurred is identified.

Figure 4:
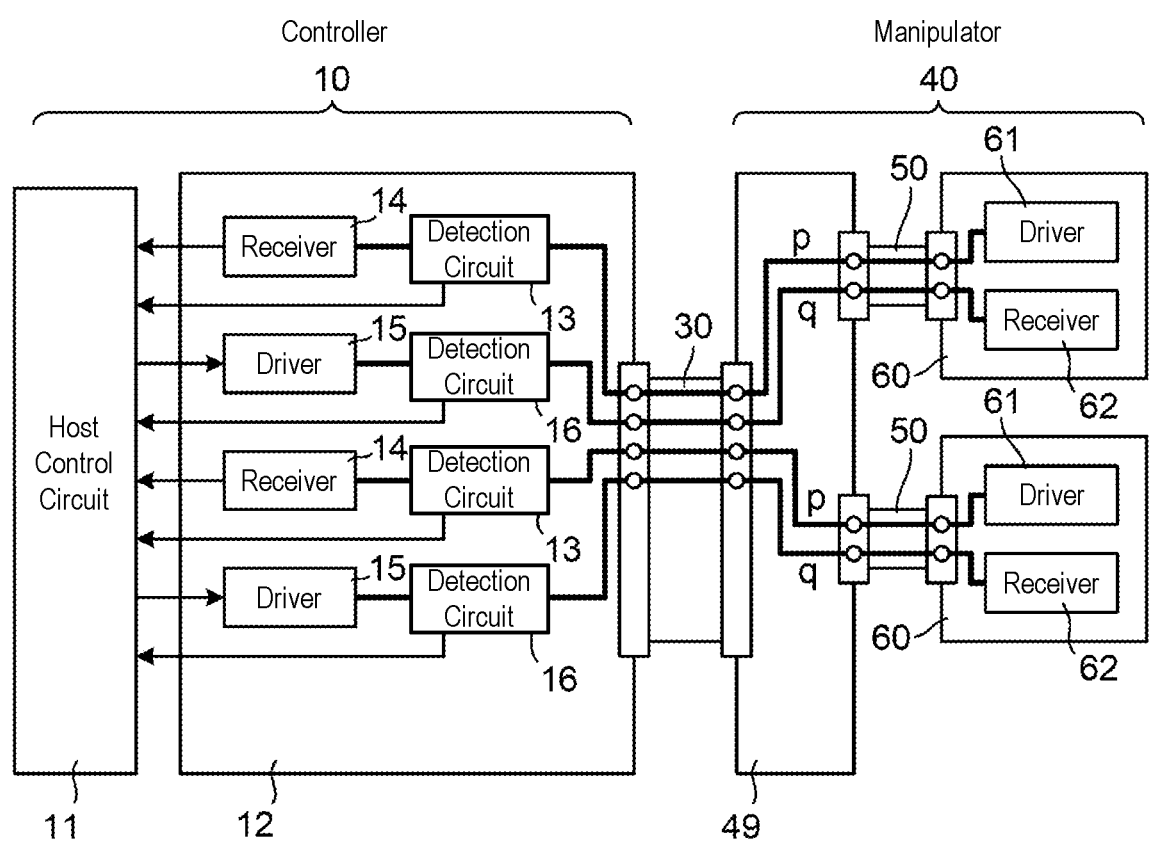
FIG. 4 is a block diagram showing a robot system in accordance with another embodiment of the present invention.

FIG. 4 is a view showing a robot system in accordance with another embodiment of the present invention. In the robot system shown in FIGS. 2 and 3, the detection circuits 42 and 45 are also provided on the manipulator 40 side in the robot system shown in FIG. 1. However, it may be difficult to provide a detection circuit on the manipulator 40 side. In such a case, as shown in FIG. 4, it may be configured that, in addition to the detection circuit 13 which detects a fault in the encoder wiring "p" through which a signal is transmitted from the encoder 60 to the controller 10, a detection circuit 16 which detects a fault in the encoder wiring "q"

through which a signal is transmitted from the controller 10 to the encoder 60 is provided in the controller 10. In the robot system shown in FIG. 1, occurrence of a fault in the encoder wiring "q" is unable to be directly detected. However, in the robot system shown in FIG. 4, occurrence of a fault in the encoder wiring "q" can be directly detected. In the encoder wiring, in a case that a signal is transmitted in a mode of differential output signals and, when the same circuit configuration as the detection circuit 13 which is described in FIG. 3 is used as the detection circuit 16, in the encoder wiring "q" in the robot system shown in FIG. 4, occurrence of a fault such as a short circuit between a signal line of a non-inverted logic signal and a signal line of an inverted logic signal, short circuits of the signal lines with a power supply and the ground, and the like can be detected.

An embodiment of the present invention may be configured as follows.

(1) A fault detection device which detects a fault having occurred in encoder wiring in a system including a controlled apparatus having an encoder and a controller controlling the controlled apparatus and, in the system, the encoder and the controller being connected with each other through the encoder wiring, in a case that a signal which is transmitted from the encoder to the controller is defined as a first signal, and a signal which is transmitted from the controller to the encoder is defined as a second signal, the fault detection device comprising: a first detection circuit which detects a fault in the encoder wiring through which the first signal is transmitted; and a second detection circuit which detects a fault in the encoder wiring through which the second signal is transmitted.

(2) The fault detection device described in the above-mentioned configuration (1), wherein at least the second detection circuit is provided in the controlled apparatus.

(3) The fault detection device described in the above-mentioned configuration (2), further including an interface part provided in the controlled apparatus, wherein the encoder wiring is divided into interface wiring between the controller and the interface part and in-apparatus wiring between the interface part and the encoder, the interface part includes a first receiver which receives the first signal through the in-apparatus wiring, a first driver which transmits the first signal through the interface wiring based on a received result in the first receiver, a second receiver which receives the second signal through the interface wiring, and a second driver which transmits the second signal through the in-apparatus wiring based on a received result in the second receiver, the first detection circuit is provided on an input side of the first receiver in the interface part, and the second detection circuit is provided on an input side of the second receiver in the interface part.

(4) The fault detection device described in the above-mentioned configuration (3), further including a processor which is provided in the interface part and is connected with the controller, wherein detection results of the first detection circuit and the second detection circuit are inputted into the processor.

(5) The fault detection device described in the above-mentioned configuration (4), wherein the controlled apparatus includes a plurality of the encoders, the encoder wiring, the first detection circuit and the second detection circuit are provided for each of the encoders, and the processor is common for the plurality of the encoders.

(6) The fault detection device described in the above-mentioned configurations (3) through (5), further including a third detection circuit which is provided in the controller and detects a fault of the interface wiring through which the first signal is transmitted.

(7) The fault detection device described in the above-mentioned configuration (1), wherein the first detection circuit and the second detection circuit are provided in an inside of the controller.

(8) The fault detection device described in the above-mentioned configurations (1) through (7), wherein each of the first signal and the second signal is transmitted in a mode of differential output signals, and each of the first detection circuit and the second detection circuit includes an exclusive OR gate.

(9) The fault detection device described in the above-mentioned configurations (1) through (8), wherein the controlled apparatus is a manipulator.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A fault detection device which detects a fault having occurred in encoder wiring in a system including a controlled apparatus having an encoder and a controller controlling the controlled apparatus and, in the system, the encoder and the controller being connected with each other through the encoder wiring,
    in a case that a signal which is transmitted from the encoder to the controller is defined as a first signal, and a signal which is transmitted from the controller to the encoder is defined as a second signal, the fault detection device comprising:
    a first detection circuit which detects a fault in the encoder wiring through which the first signal is transmitted from the encoder to the controller;
    a second detection circuit which detects a fault in the encoder wiring through which the second signal is transmitted from the controller to the encoder, wherein the second detection circuit is provided in the controlled apparatus; and
    an interface part provided in the controlled apparatus, wherein the encoder wiring is divided into interface wiring between the controller and the interface part and in-apparatus wiring between the interface part and the encoder, the interface part comprises:
        a first receiver which receives the first signal through the in-apparatus wiring,
        a first driver which transmits the first signal through the interface wiring based on a received result in the first receiver,
        a second receiver which receives the second signal through the interface wiring, and
        a second driver which transmits the second signal through the in-apparatus wiring based on a received result in the second receiver,
        the first detection circuit is provided on an input side of the first receiver in the interface part, and
        the second detection circuit is provided on an input side of the second receiver in the interface part.

2. The fault detection device according to claim 1, further comprising a processor which is provided in the interface part and is connected with the controller,
  wherein detection results of the first detection circuit and the second detection circuit are inputted into the processor.

3. The fault detection device according to claim 2, wherein
  the controlled apparatus includes a plurality of the encoders,
  the encoder wiring, the first detection circuit and the second detection circuit are provided for each of the encoders, and
  the processor is common for the plurality of the encoders.

4. The fault detection device according to claim 1, further comprising a third detection circuit which is provided in an inside of the controller and detects a fault of the interface wiring through which the first signal is transmitted.

5. The fault detection device according to claim 1, wherein
  each of the first signal and the second signal is transmitted in a mode of differential output signals, and
  each of the first detection circuit and the second detection circuit includes an exclusive OR gate.

6. The fault detection device according to claim 1, wherein the controlled apparatus is a manipulator.

7. The fault detection device according to claim 1, wherein the first detection circuit is provided in an inside of the controller.

* * * * *